US008510282B2

(12) United States Patent
Murali

(10) Patent No.: US 8,510,282 B2
(45) Date of Patent: Aug. 13, 2013

(54) THREAD-BASED WEB BROWSING HISTORY

(76) Inventor: Chigurupati Murali, New York, NY (US)

(*) Notice: Subject to any disclaimer, the term of this patent is extended or adjusted under 35 U.S.C. 154(b) by 410 days.

(21) Appl. No.: 12/291,706

(22) Filed: Nov. 13, 2008

(65) Prior Publication Data

US 2009/0240686 A1    Sep. 24, 2009

Related U.S. Application Data

(60) Provisional application No. 61/038,917, filed on Mar. 24, 2008.

(51) Int. Cl.
  G06F 7/00      (2006.01)
  G06F 17/30     (2006.01)
  G06F 15/173    (2006.01)
  G06F 3/00      (2006.01)

(52) U.S. Cl.
  USPC ........... 707/705; 707/736; 707/737; 715/738; 715/739; 715/744; 709/217; 709/224

(58) Field of Classification Search
  USPC ............. 707/999.01, 999.102, 705, 706, 722, 707/736, 737; 715/200, 777, 738, 739, 744; 709/217, 224
  See application file for complete search history.

(56) References Cited

U.S. PATENT DOCUMENTS

| | | | | |
|---|---|---|---|---|
| 5,941,957 A * | 8/1999 | Ingrassia et al. | | 709/248 |
| 6,037,934 A * | 3/2000 | Himmel et al. | | 707/E17.114 |
| 6,184,886 B1 * | 2/2001 | Bates et al. | | 707/E17.114 |
| 6,314,423 B1 * | 11/2001 | Himmel et al. | | 715/205 |
| 6,460,038 B1 * | 10/2002 | Khan et al. | | 707/999.01 |
| 6,526,424 B2 * | 2/2003 | Kanno et al. | | 715/229 |
| 6,631,496 B1 * | 10/2003 | Li et al. | | 707/999.102 |
| 6,839,879 B1 * | 1/2005 | Hwang | | 715/273 |
| 7,756,860 B2 * | 7/2010 | Hamilton et al. | | 707/718 |
| 7,987,491 B2 * | 7/2011 | Reisman | | 725/112 |
| 2008/0082935 A1 * | 4/2008 | Relyea et al. | | 715/777 |
| 2008/0133501 A1 * | 6/2008 | Andersen et al. | | 715/764 |
| 2008/0147644 A1 | 6/2008 | Aridor et al. | | |
| 2008/0148161 A1 | 6/2008 | Hebert et al. | | |
| 2008/0154582 A1 | 6/2008 | Bruecken | | |
| 2008/0154608 A1 | 6/2008 | Evermann et al. | | |
| 2008/0154612 A1 | 6/2008 | Evermann et al. | | |

(Continued)

OTHER PUBLICATIONS

Firefox 3 Browser reviews—CNET Reviews, Jun. 26, 2008, pp. 1-7 http://reviews.cnet.com/browsers/firefox-3/4505-3514_7-33087853.html.

(Continued)

*Primary Examiner* — Vincent F Boccio
(74) *Attorney, Agent, or Firm* — Alan Tenenbaum

(57) ABSTRACT

A method and system for cataloguing browsing activity into separate browsing threads. Each browsing thread is an archived set of links that were considered during a specific time-period. The user is also provided with the ability to add metadata to a browsing history. The invention permits the user to reload an archived thread and resume any browsing from the point at which the thread was paused or suspended. In addition, the method and system provides cataloguing of the user browsing activity into separate threads with the ability to add metadata to threads or the individual entries within a thread. The threads may also be archived by date and time and indexed by keyword such that saved threads may be located, resumed, reviewed, and amended at a later point in time, including by other users, if desired.

12 Claims, 10 Drawing Sheets

(56) References Cited

U.S. PATENT DOCUMENTS

| | | |
|---|---|---|
| 2008/0154859 A1 | 6/2008 | Chi et al. |
| 2008/0154933 A1 | 6/2008 | Galvin et al. |
| 2008/0155059 A1 | 6/2008 | Hardin et al. |
| 2008/0155409 A1 | 6/2008 | Santana |
| 2008/0155613 A1 | 6/2008 | Benya et al. |

OTHER PUBLICATIONS

Googlel™ Chrome, p. 1, Mar. 5, 2009 http://www.google.com/chrome.

* cited by examiner

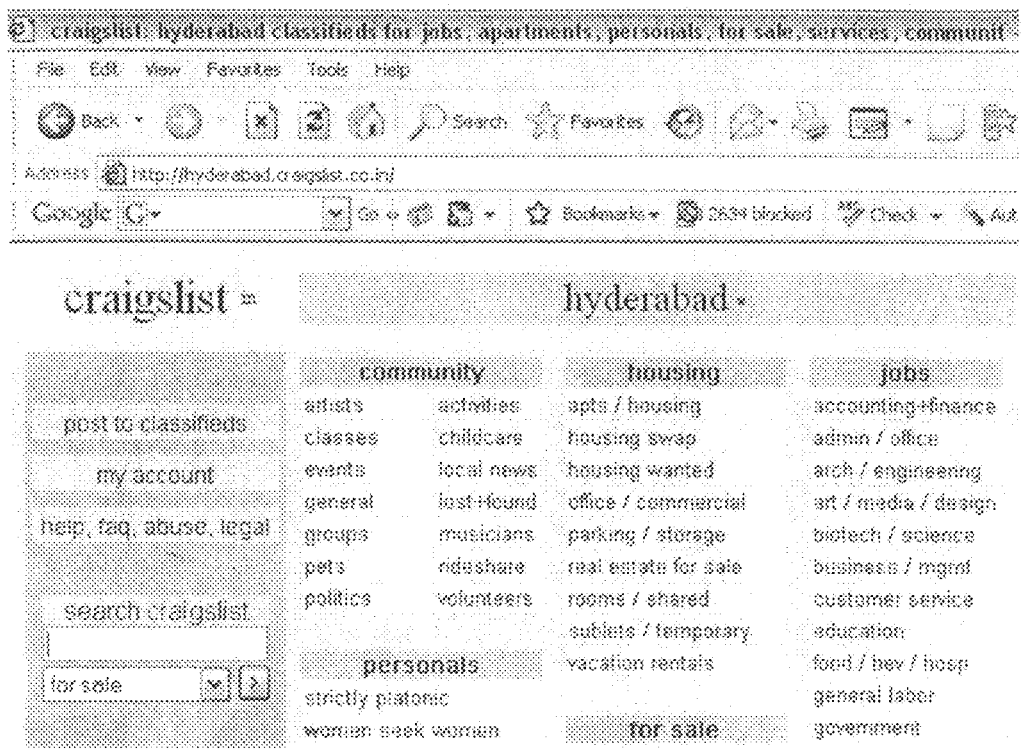
-- PRIOR ART --    FIG. 1.
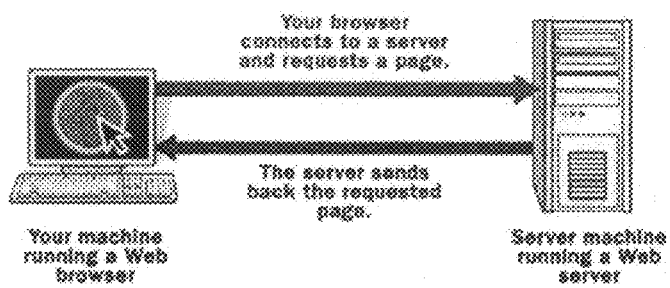
FIG. 2
-- PRIOR ART --

-- PRIOR ART --

THREAD-BASED WEB BROWSING HISTORY

RELATED APPLICATIONS

This application claims priority from U.S. Provisional Patent Application Ser. No. 61/038,917 filed on Mar. 24, 2008, the content of which is incorporated herein in its entirety.

BACKGROUND OF THE INVENTION

1. Field of the Invention

The present invention generally relates to the field of graphical user interfaces for web browsing and provides a novel method for constructing a browsing history. More particularly, disclosed is a method and system for cataloguing browsing activity into separate browsing threads. The method and system also provides the ability to add metadata to the browsing history.

2. Description of the Related Art

The World Wide Web (hereafter the "web" or "Internet") has rapidly become a critical information resource for people around the world. It is estimated that there are more than 100 million web sites and over 1 billion users on the Internet today. Each of these users accesses sites using a software device known as a web browser. Some of the more popular, known browsers include Microsoft® Internet Explorer, Firefox and Safari®.

As shown in FIG. 1, while "browsing" the Internet, a user retrieves information from the web by viewing a page currently loaded in the browser and clicking on one of the displayed hyperlinks to load a new page of interest. Clicking on the hyperlink generates a request for a new web page from a web server. As shown in FIG. 2, this server responds to the request from the user and delivers a web page to the browser, which displays the web page for the user to view. The user may then browse the new page and/or choose a new link to follow to proceed to a new web page or other content. By repeating this process on each new page, the user generates a time sequence of pages browsed on the web.

In general, information searches require a user to visit many sites and sift through large amounts of content to find desired content or information that is needed. Consequently, conventional browsers always include features that enable the user to maintain a record of visited sites that the user may deem useful.

Bookmarking is one common feature that is used to provide a way to retrieve information, i.e., maintain a record of visited sites. For example, when the user wants to remember a specific site, he stores the address of the site as a "bookmark" in the browser. With the site address recorded, he can return to the site without repeating the original navigation.

After bookmarking a large number of sites, it may become difficult for the user to retrieve information from his collection of stored sites. Moreover, bookmarks are typically stored in regions called folders. The user must therefore decide how to organize saved links associated with the stored bookmarks. It is typical for a user to forget the significance of a specific stored bookmark. In addition, the user loses valuable contextual information contained in the path navigated to the site.

"Tagging" is one alternative to folders that has become popular for organizing bookmarks. A tag is a user-defined keyword (or set of keywords) that is stored with the bookmarked site. Here, the keyword is used to retrieve the saved addresses associated with the bookmarked site. Although similar to a folder system, in that the user must choose labels to associate with bookmarks, tagging is usually seen as a more convenient organizational method.

The web site Del.icio.us has helped to popularize tagging. Here users can tag sites with their own labels and store these bookmarks online for access from any computer. In addition, users can make their tagged site publicly visible, and the site can show statistics and historical information about the most frequently tagged sites.

Notwithstanding the foregoing features, the main disadvantage associated with bookmarks is their lack of context associated with a saved address. In particular, when retrieving information on a specific subject, the search can evolve as the user studies the subject. With bookmarking alone, it is impossible to keep track of the search, such as what has been tried, what has been useful or what has not been helpful. Information specific to the search criterion is especially useful if the user subsequently continues his search. Where the user is only provided with individual bookmarks as the search guide, the user, upon resuming his search, will consume significant amounts of time reproducing the previously obtained search results.

Conventional browsers record the history of the user's browsing session. FIG. 3 shows a format that is used to display the history of a user's browsing session, where a list showing the site name is depicted. The history list may also provide a depiction of a particular address visited and the time of visit to the particular address. However, a user may navigate through many sites while browsing and, thus, create an extremely long history list. A single user can often visit hundreds of sites on any given, single day. As a result, an extremely long list may be created by the history tracking feature, making it difficult for the user to subsequently retrieve relevant information from the long list of previously viewed links.

Google™ has developed an enhanced browsing history service. Here, users record their browsing history on a Google™ server after installing specialized software. The users can bookmark sites and apply tags as described above, and can add notes to any bookmarked site entry. The database provided by Google™ is searchable, while also providing certain information on trends.

Firefox is another known web browser. The most recent version of the Firefox browser, e.g., version 3.0, also provides enhanced history and bookmarking features. Here, the user can bookmark sites and apply tags as described above. The user can also add notes and generic keywords to individual sites. The history provided by Firefox is user searchable.

Firefox 3.0 also has an enhanced address bar, which permits the user to type in any tag or keyword, where the browser will display all matching sites found in the browsing history. The enhanced address bar provides a convenient way to access information in the browsing history database directly from the primary navigational control. However, the address bar feature requires the user to remember at least a portion of the desired address, tag or keyword.

Information search and retrieval is slow and the user typically does not complete a search in one session. The user may wish to stop and return later to resume browsing at the point where he decided to pause. The user may also wish to switch between independent research subjects or may simply decide to start a new search while in the middle of the current search. The previously-described features enhance the ability of the user to archive and recall useful information that is obtained while browsing the web. However, these features fail to capture information about the browsing process. The present invention assists users in overcoming these drawbacks when conducting research.

SUMMARY OF THE INVENTION

Disclosed is a system and method that provides a user with a systematic characterization of browsing histories divided into separate browsing threads. Each browsing thread is an archived set of links initially considered by a user during a specific time-period. The thread can represent a specific theme of interest to or research task initiated by the user. The user is advantageously permitted to reload an archived thread and resume any investigation from the point at which the thread was paused or suspended. The thread can contain links browsed in one or more windows or tabs. Alternatively, a single window can be used to create one or more threads.

The disclosed system and method generates a history list of the browsing activity of the user. In addition, the method and system provides cataloguing of the user browsing activity into separate threads with the ability to add metadata, i.e., information that describes the content, quality, condition, origin, and other characteristics of data or other pieces of information. Here, the catalog is archived by date and time and indexed by keyword. The user may resume any individual thread at any time after it was suspended. Search and retrieval functions are also provided which enable the user to recall entire threads, individual sites and related information using keywords, as well as the date and time that the browsing thread occurred.

The disclosed contemplated embodiments also provide a platform to generate revenue based on user browsing threads. For example, business users conducting web-based research for others can account for the activity of a user during a specific period of time that the user is engaged in a browsing thread. Here, the revenue that is generated is based on activity logs that businesses provide to clients, which indicate the level of usage pursuant to performing searches. The method also provides means to audit the activities of employees.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The foregoing and other advantages and features of the invention will become more apparent from the detailed description of the preferred embodiments of the invention given below with reference to the accompanying drawings in which:

FIG. 1 is a screen capture illustrating a view provided to a user while "browsing" the Internet.

FIG. 2 is schematic illustration of the components that interact pursuant to a user clicking on a hyperlink, which generates a request for a new web page from a web server;

DETAILED DESCRIPTION OF THE EXEMPLARY EMBODIMENT

A method and system are disclosed for providing a user with a systematic characterization of browsing histories with separate browsing threads. In accordance with the disclosed embodiments, each browsing thread is an archived set of links initially considered by a user during a specific time-period along with a keyword index derived from data fields in the history list. The user is advantageously permitted to reload an archived thread and resume any investigation from the point at which the session was paused or suspended. The thread can contain links browsed in one or more windows or tabs. Alternatively, a single window can be used to create one or more threads.

The disclosed system and method permits the user to develop a history of web browsing activity by creating a catalog of browsing threads. Each thread contains the history of sites visited during the browsing thread, i.e., a history list, as well as associated data including user-supplied metadata. Here, the metadata comprises information that describes the content, quality, condition, origin, and other characteristics of data or other pieces of information. The catalog is archived by date and time and indexed by keyword with information summarizing each browsing thread. The method and system additionally provides functions that permit the user to search the catalog to retrieve entire browsing threads, individual sites and associated data for review and resumption or revisit.

In the preferred embodiment, the method comprises an enhancement or plug-in module for existing web browser software, such as Microsoft® Internet Explorer, Safari®, Firefox or Google™ Chrome. Here, the enhancement is based on the features that are typically found in conventional browser software, i.e., (i) an interface for plug-in enhancements; (ii) completion event for document loading, where the web browser is typically configured to signal to the plug-in module that a document has finished loading; (iii) site location and name. Here, the plug-in is configured to obtain the title and address of the current site from the browser; (iv) externally controllable navigation function: the plug-in can navigate the browser to a new site; and (v) a document source, where the browser can provide the plug-in with the document source for the currently loaded page.

Figure 3:
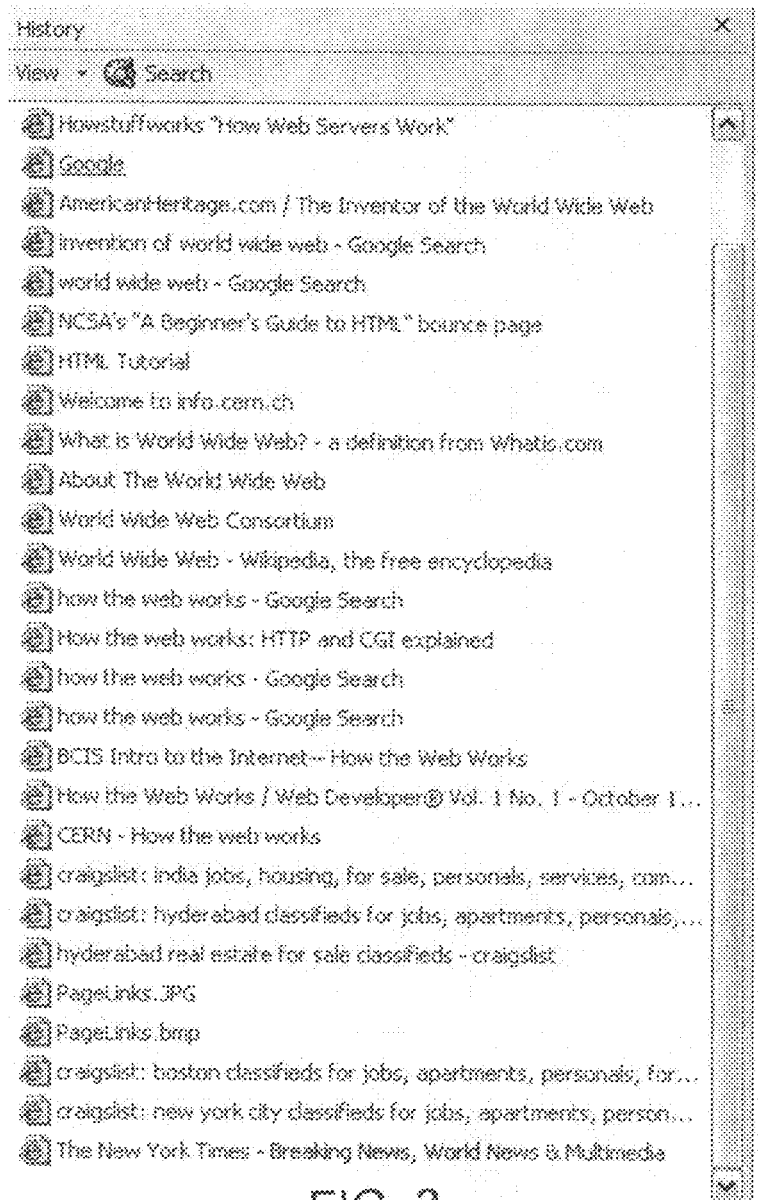
FIG. 3 is a screen capture illustrating a conventional format that is used to provide a user with a detailed history of a browsing session.
Figure 4:
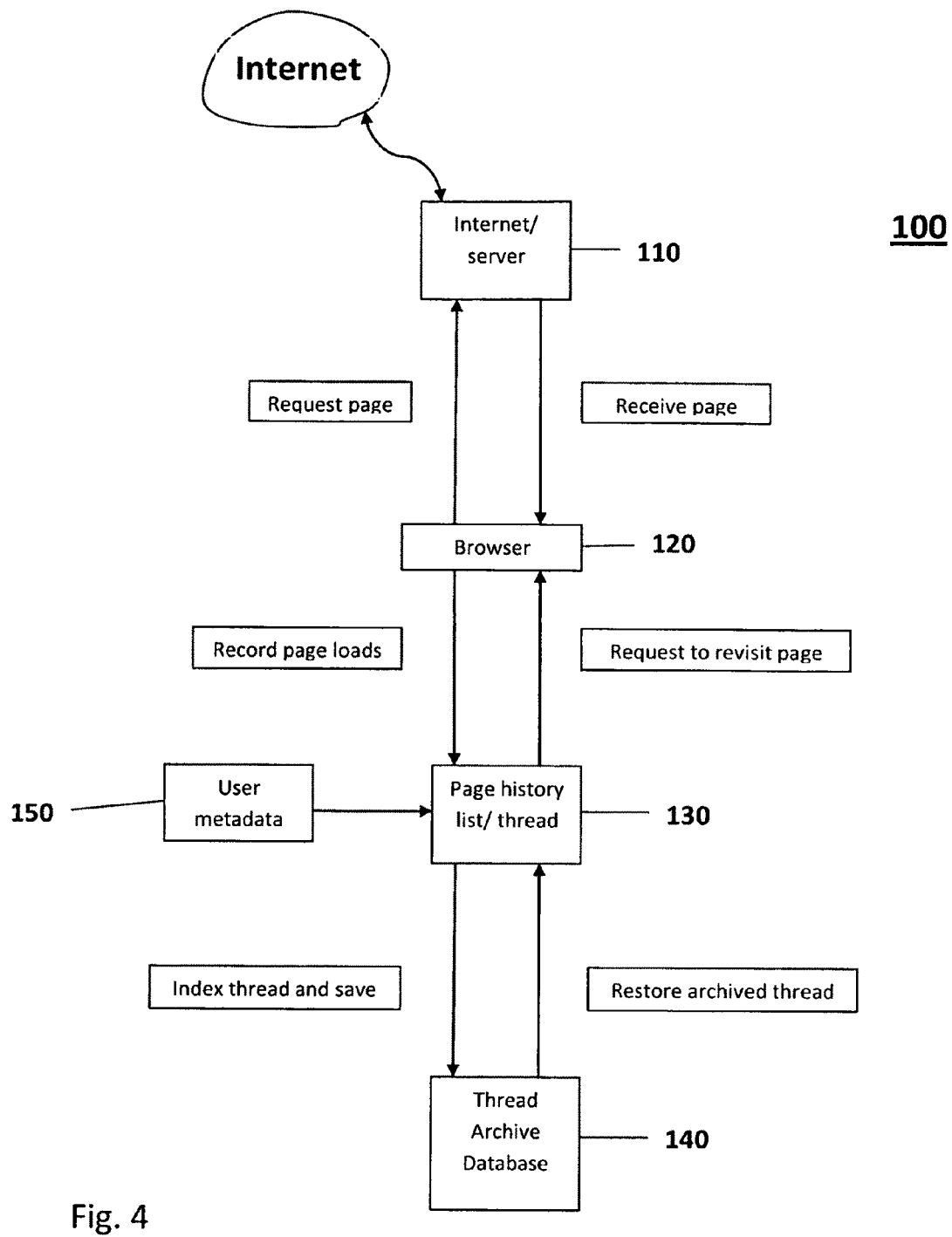
FIG. 4 is a functional block diagram of a system for cataloguing browsing activity into separate browsing threads in accordance with the invention.

FIG. 4 is a functional block diagram of the system 100 for cataloguing browsing activity into separate threads that also provides the ability to add metadata to the browsing history in accordance with the invention. In general, the system 100 comprises a server 11 that interfaces with the Internet or the web to provide user access to the vast array of information that is available. The server 11 receives page requests that are sent from the existing web browser software that has been provided with the enhancement or plug-in module in accordance with the invention. In response to the page requests, the server 11 acts to provide user access to the requested pages via the web browser 12.

While the user browses to new sites, the web browser 12 notifies the plug-in that page loading is complete and provides the title and address of the new site. Each thread contains the history of sites visited during the browsing thread, as well as associated data including user-supplied metadata that is stored in a metadata database 15. The system and method may also provide a user with the ability to select whether new sites are automatically logged to a thread archive database 14. If the user has enabled automatic logging of new sites, a new entry is added to the history list for this site that is stored in the thread archive database. If automatic logging is disabled, then a recording does not occur unless the user manually requests logging. A user can continue browsing or utilize one of the history-enhancing functions such that an enhanced history may be created. Each thread contains the history of the sites visited during the browsing thread (logged automatically or manually), as well as associated data including user-supplied metadata that is stored in a metadata database 15.

Figure 5:
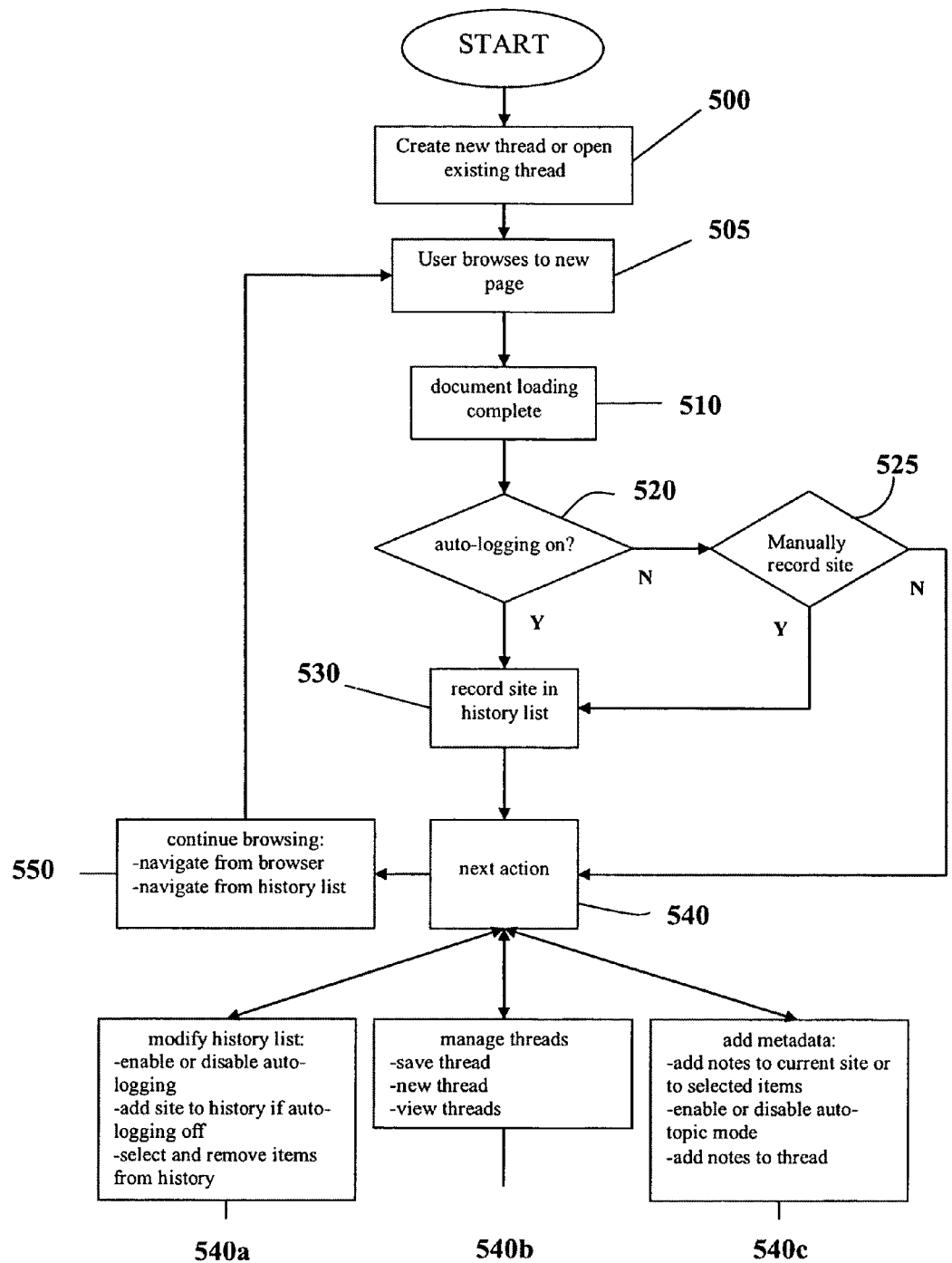
FIG. 5 is a flow chart illustrating steps of the method that can be implemented to create an enhanced browsing history list in accordance with the invention.

FIG. 5 is a flow chart illustrating the steps implemented to create an enhanced history list in accordance with the invention. A request is made to create a new thread or open an existing thread, as indicated in step 500. While using the web browser during a browsing thread, a user browses to a new web page, as indicated in step 505. Document loading is performed and a notification that the document is fully loaded is provided, as indicated in step 510.

A check is performed to determine whether the user has activated automatic logging, as indicated in step 520. If the user has activated automatic logging, then the site is recorded into the history list, as indicated in step 530. From this point, a number of user actions may occur. For example, the user may modify the history list, as indicated in step 540a. Modifications of the history list include enabling or disabling auto logging, manually adding the current site to the history list if the auto logging function is deactivated or selecting and removing items from the history list.

The system and method also provide the user with the ability to manage threads by providing the option to save a thread, or start a new thread, or to view previously saved threads, as indicated in step 540b. The user is also provided with the ability to add metadata, as indicated in step 540c. The metadata may comprise information, such as notes or plain text associated with the current site or selected sites, information for enabling or disabling the implementation of an auto topic mode, or notes added to a web browsing thread.

The user may also continue to browse the Internet, as indicated in step 550. Here, it should be readily appreciated that the user may continue to navigate the Internet via the browser. The user can also navigate away from the current history list.

Figures 6, 8:
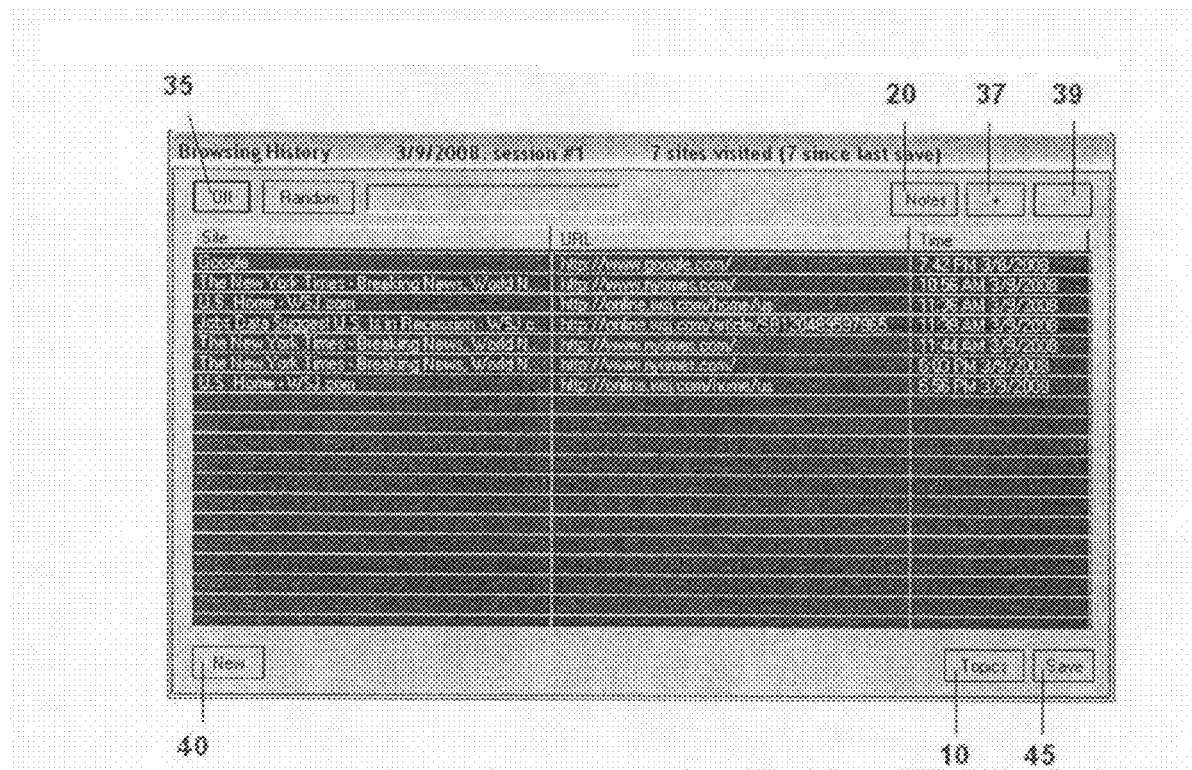
FIG. 6 is a screen capture of the browsing history list in accordance an embodiment of the invention.
FIG. 8 is an illustration of the session data and index information data that are saved as disk files in accordance with the invention.

FIG. 6 is a screen capture of the browsing history list in accordance with an embodiment of the invention illustrating the history list in a window separate from the web browser, which provides a plurality of controls for providing the enhanced history list. With specific reference to FIG. 6, the auto-logging toggle button 35 allows the user to enable or disable automatic logging of sites in the history list. The add button 37 allows the user to manually add the current site to the history list when auto-logging is disabled. The remove button 39 allows the user to remove sites from the history list, i.e., if items are selected, they are removed from the history list. Conversely, if no items are selected, the last visited web site is removed from the history list. In this case, the last visited web site is U.S. Home-WSJ.com. Consequently, the entry associated with U.S. Home-WSJ.com would be removed from the history list. Of course, the buttons could be replaced with alternative types of control mechanisms, such as tabs and drop-down lists, etc.

In accordance with the method and system of the invention, the user can save an individual thread into the thread archive database 140 after logging specific web sites that are located during browsing. A manually controlled save button 45 is also provided that permits the user to save the web browsing thread. In an alternative embodiment, the browsing thread is automatically saved after the user has visited a certain number of sites subsequent to the last save that was performed. The user may also be provided with the option to set the number of sites visited prior to saving.

Each web browsing thread is identified by an identifier, such as a unique name or code. In one embodiment, the identifier comprises a combination of the current date and an integer that denotes an ordinal session number for the day.

Figure 7:
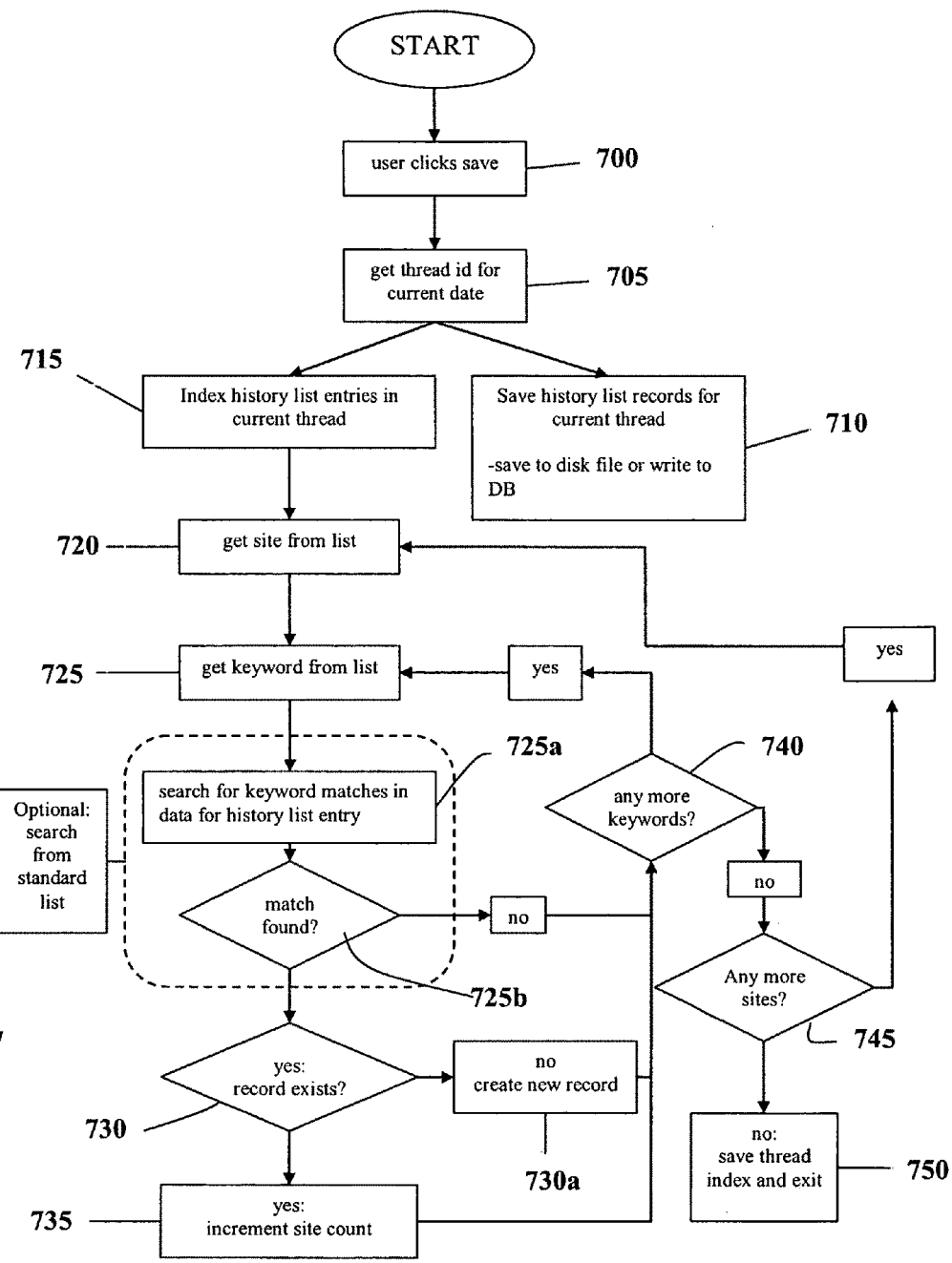
FIG. 7 is a flow chart illustrating the steps of the method for saving and indexing a browsing thread in accordance with the invention.

When saved, the current thread is indexed and catalogued in the thread archive database 140 (see FIG. 4). The thread is indexed using a list of user-assigned keywords. FIG. 7 is a flow chart illustrating the steps implemented to save and index a browsing thread in accordance with the invention. As shown in FIG. 7, the user uses the save button to initiate a save of the browsing session, as indicated in step 700. A current thread id is obtained for the current date of the browsing thread, as indicated in step 705. Next, the history list of the current browsing thread is saved, as indicated in steps 710.

Indexing of the thread is also performed, as indicated in step 715. Each site is obtained in sequence from the history list, as indicated in step 720. Next, a specific key word is obtained from the site keyword list, as indicated in step 725. The user assigns these keywords to specific sites that are visited during the thread using a Topic field that is described subsequently. Each user assigned keyword is compared with the existing records in the index for the thread, as indicated in step 730. If the keyword has already been found on a site previously obtained from the thread history list, then a record for that keyword exists in the index for the thread and the site count for that keyword is incremented, as indicated in step 730a. If the record for that keyword does not exist, then a record for the keyword is added to the index for the thread with an initial site count of 1, as indicated in step 735. The indexing procedure continues with the next keyword in the site keyword list, as indicated in step 740.

In an alternative embodiment (see the steps encircled by dashes in FIG. 7), indexing can be achieved by searching for a predefined set of keywords in the available fields in the history list record, as indicated in step 725a. If a match is found for a specific keyword in step 725b, then the indexing is continued, as indicated at step 730. If a match is not found in step 725b, then the indexing is continued with the next keyword, as indicated in step 740. In an embodiment, the keyword search is performed on the actual web page. If a record is located in the predefined set of keywords or if the keyword is user-assigned, then a check is performed to determine whether the current thread index contains a record for this keyword, as indicated in step 730. If the current thread index does not include a record for the keyword, then a new record is created in the index, as indicated in step 730*a*. However, if the current thread index contains a record for this keyword, then the number of sites matching this keyword in the current thread index is incremented, as indicated in step 735. It should be appreciated that the search is performed to a level for as many keywords as is computationally feasible.

After checking to determine whether the current thread index includes a record for the keyword, a check is performed to determine the existence of additional keywords, as indicated in step 740. If there are additional keywords, then a return to step 725 occurs.

If the current thread index contains no additional keywords in the record, then a check is performed to determine the existence of additional history list entries for indexing, as indicated in step 745. If there are additional entries for indexing, then a return to step 720 occurs. If there are no additional entries for indexing, then the thread is saved and the web browsing history listed is terminated, as indicated in step 750. It should be noted that the user is not limited to saving the browsing thread at this specific moment in time (i.e., at step 750). Rather, in accordance with the contemplated embodiments, the user is permitted to save the thread at any given moment in time. However, each time that the web browsing thread is saved, it is saved and indexed using the current history list.

In the preferred embodiment, extensible markup language (XML) serialization is utilized to archive the thread, which provides a simple way to save the history list and index at a given moment in time, as well as a simplified way to permit re-loading of the saved history list and index at a subsequent point in time. The thread data and the index information may be saved as disk files, in an exemplary format with file extensions as shown in FIG. 8.

For optimal performance, it is preferable to write all information to a database; however, this entails providing each user with database software to support the invention. The data may be stored locally or remotely, or on a portable drive or memory device.

Returning to FIG. 6, as stated, the user can start a new browsing thread at any moment in time. Initiation of a new browsing thread may be manually achieved by clicking the new button 40. When a new thread is initiated, the current thread is stored in memory, the thread identifier is updated and the history list is cleared of all entries. It should be appreciated that a new thread may also initiated each time the browser is started or restarted or when a new tab window is opened in the current instance of the browser.

Figure 9:
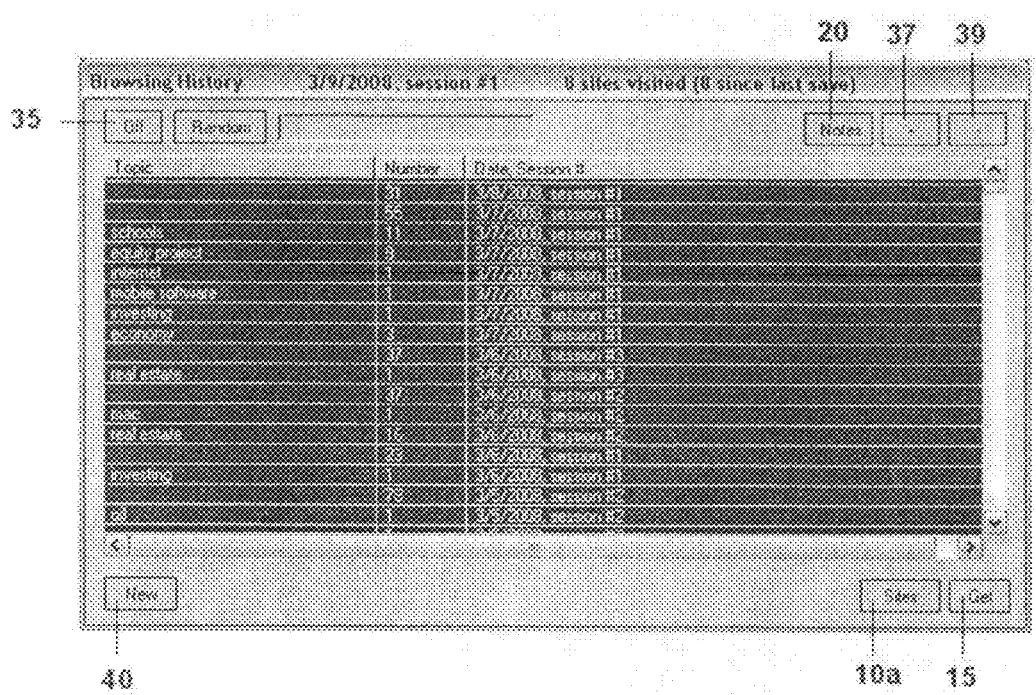
FIG. 9 is a screen capture illustrating a list of thread index records in accordance with the invention.

In accordance with the present contemplated embodiment, it is possible to view the list of thread index records. FIG. 9 is a screen capture illustrating such a list of thread index records. With reference to FIGS. 6 and 9, clicking the Topics button 10 causes the browsing history window to update such that the thread index records are displayed. Here, each individual line that is displayed represents a thread record. The records include the keyword (topic), the number of sites in the browsing thread under each keyword and the thread id code for each keyword.

These records provide the user with the information with which to retrieve web sites from the history list. The user selects the desired records in the list and clicks the "Get" button 15 to retrieve all of the web sites that are referenced by the specific records. Retrieved sites and associated data are displayed in the history list (see FIG. 6). The user may also return to the previous history list by toggling the "Sites" button 10*a* (FIG. 9).

The disclosed method and system permit the user to revisit sites displayed in the history list. Double-clicking on an entry within the history list causes the web site to reload into the web browser. In the preferred embodiment, an externally controlled navigation function is invoked in the web browser using a callback function that is interfaced to the plug-in. The browser retrieves the currently available version of the page from the server. The system may be programmed such that sites revisited by double-clicking on the entry in the history list are not rerecorded to minimize the number of entries in the history list. In such cases, the visit time associated with the web site is updated, and the entry is moved to the end of the history list to indicate that it is the most recently visited site. It should be understood that the entry could readily be moved to the top of the list to thereby indicate that it is the most recently visited site, or that multiple entries can be recorded and returned in the history list.

In addition, the user is provided with a search engine that permits searching of the thread history to retrieve particular thread records or individual sites. The choice between whether thread records or individual sites are retrieved by the search is set as a user preference at the time that the search is begun. In particular, the keyword in the thread record is searchable within a specified date range. The site metadata fields are also searchable within a specified range. In the alternative embodiments, the user is provided with the option to specifically search the actual web page.

It should be noted that the display of the catalog of browsing threads is not limited to the list view. That is, the system and method of the invention provide multiple options for displaying the data. In one embodiment, the records are displayed in a calendar format to provide a chronological record of the user's browsing threads.

Figure 10:
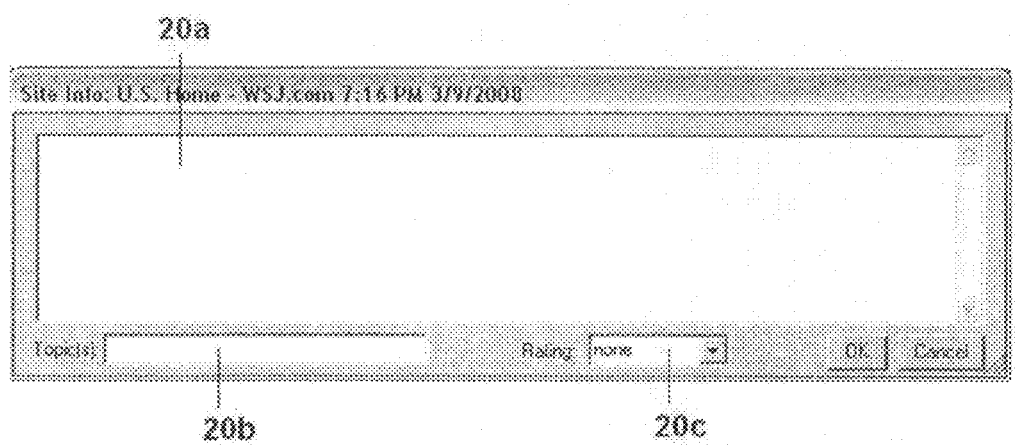
FIG. 10 is a screen capture illustrating a dialog that permits a user to enter metadata to a site visited during a browsing thread.

FIG. 10 is a screen capture illustrating a dialog that permits a user to enter metadata to a site visited during a browsing thread. Activating the notes button 20 (FIG. 6) causes the creation of an information dialog that is associated with the web site, where custom information can be added to the web site record in the history list. The note field 20*a* shown in FIG. 10 is configured to accept any type of text input. The topic field 20*b* is used to accept entry of user-assigned keywords. In accordance with the contemplated embodiments, a semi-colon is used to separate multiple metadata entries, where the topic field 20*b* is used to supply the keywords for indexing. It should be appreciated that other indicators could be used to separate multiple metadata entries, such as a comma. A ratings field 20*c* may also be included to provide a list of possible selections for categorizing the metadata, such as good, bad, none, look again.

Figure 11:
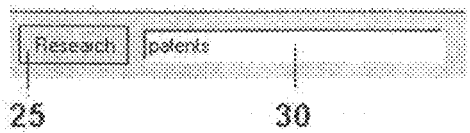
FIG. 11 is a screen capture illustrating a dialog that permits a user to perform research during a browsing thread.

The disclosed method and system provides multiple browsing modes. In one embodiment, two browsing modes are provided, i.e. a random browsing mode and a research mode. The user may switch between the two modes using the toggle button 25 that is shown in FIG. 11. With specific reference to FIG. 11, during research mode, the text field 30 is enabled to accept user input of topic keywords that are automatically applied to the topic field of each new web site visited by the user during a browsing thread. In random mode, however, the text field is disabled and the topic field in newly visited sites remains empty until filled using the site info dialog shown in FIG. 10 that accepts the user entered metadata. Alternative layouts and arrangements for the layout (interface) are possible, including, for example, tabs and/or drop down lists.

Figure 12:
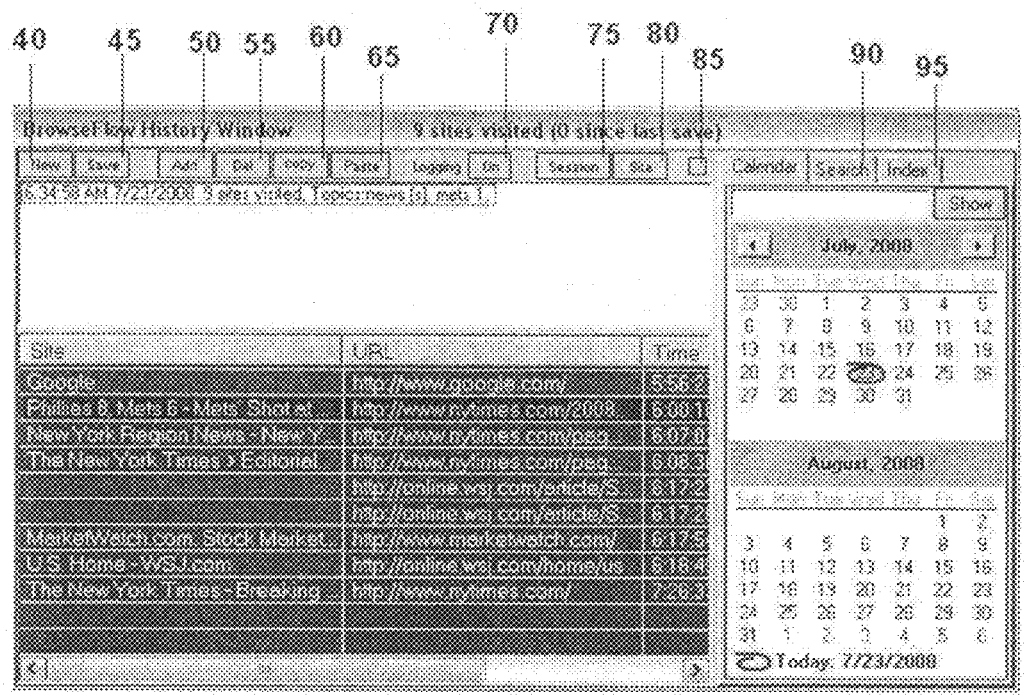
FIG. 12 is a screen capture of a browsing history window in accordance with a preferred embodiment.

FIG. 12 is a screen capture of a browsing history window in accordance with the invention. Here, the browsing history list is provided with the same format as the previously described browsing history list shown in FIG. 6. However, the layout shown in FIG. 12 differs in the way the thread list of FIG. 6 and a tabbed data retrieval panel 35 of the browsing history window of FIG. 12 is provided. Moreover, all control buttons are placed, for example, in a row above the data panels.

In another embodiment, a New button 40 permits the user to start a new thread at any moment in time during the current browsing thread, a Save button 45 permits the user to save the current thread at any moment in time during the browsing thread. An Add button 50, a Logging button 70 and a Site button 80 are provided to activate the associated function. Also included is a Del button 55 that functions in much the same manner as the Remove button 39 of the previous embodiment, i.e., the Del button 55 of the preferred embodiment allows the user to delete individual sites from the history list or entire threads from the thread archive.

This embodiment also permits the user to add metadata to his entire web browsing thread. Here, the Session button 75 opens a dialog in a manner similar to the Site dialog of FIG. 10, where the user can then add information about the thread.

As shown in FIG. 12, the browser history list provides a display of lists that include a set of loadable threads. When the user loads any of the displayed threads, the configuration associated with the list of sites in the history list that was saved in the specific web browsing thread is reloaded and restored.

A random access list of all existing web browsing threads is maintained in the preferred embodiment of the disclosed system and method of the invention. Consequently, it becomes possible to restore a web browsing thread at any moment in time while the user is engaged in a browsing thread. Threads may also be edited, deleted and combined partially or fully with other threads. Threads may also run concurrently.

The invention also provides the user with the ability to retrieve browsing threads by date, which can be implemented with a calendar view 35. Here, the selection of a date in the illustrated calendar will cause the display of browsing threads that corresponds to the date stamp of a specific browsing session. The date stamp of the browsing thread may be assigned using the most recent visit time of any web site that is included in the browsing thread, the date that the thread was first created, or a date set by the user.

Figure 13:
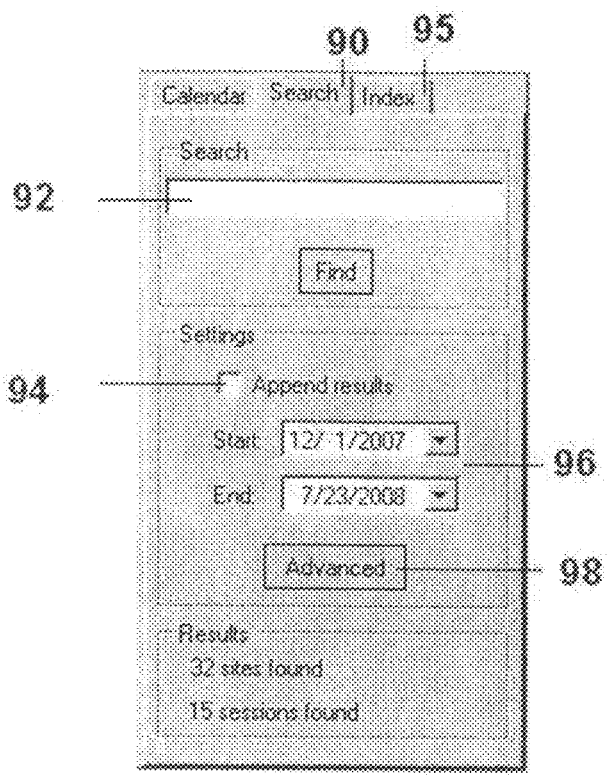
FIG. 13 is a screen capture of a dialog tab that permits a user to perform research during a browsing thread in accordance with the preferred embodiment.

In addition, the invention includes the ability to retrieve web sites and/or browsing threads by keyword and/or phrase. FIG. 13 is a screen capture illustrating a dialog tab that permits a user to perform research during a browsing session. The dialog includes a search tab 90 and an index tab 95. The user may perform a search to locate sites and browsing threads by inputting into the entry field 92 any keyword or phrase field to locate a match of the input keyword or phrase in the sites and/or browsing threads. The user may thereafter append search results to the current browsing thread using the append option 94. It is also possible to post the search results to a new browsing thread where the append option is unselected. Moreover, it is possible to restrict the search to a specific date range 96 and to specific data fields, such as Name, URL, Notes, Topic for a site and Notes and Topic for a browsing thread, or any combination thereof. The selection of specific data fields occurs by selecting appropriate fields in a dialog box (not shown) that would be activated upon selecting the advanced button 98 shown in FIG. 13. In addition, each field can be included or excluded using appropriate checkboxes in the dialog. Upon locating web sites that match the input search terms, the located sites are displayed in the site history list, while thread matches are displayed in the thread list of the browser history window.

Figure 14:
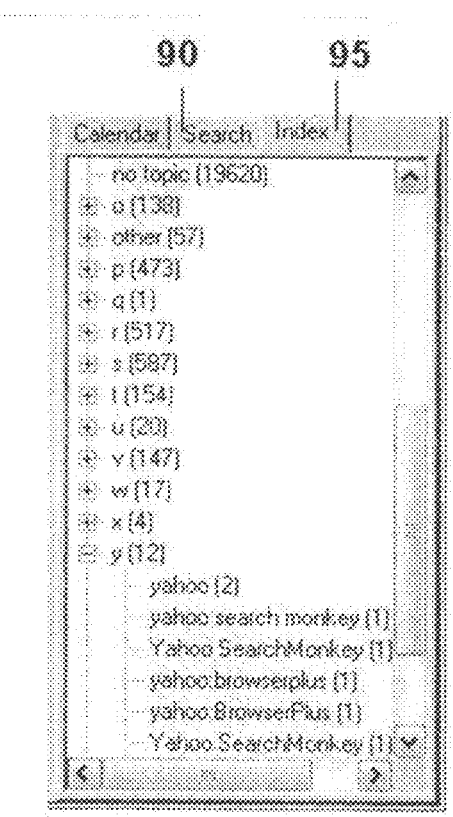
FIG. 14 is a screen capture of the index tab of the browser history window of FIG. 12.

FIG. 14 is a screen capture of the index tab 90 of the browser history window of FIG. 11. When the index tab 90 is selected, an alphabetized list of all assigned site topics (i.e., an index) in the browser history list is created. The user is then permitted to use the index to directly retrieve the matching sites. Threads corresponding to the retrieved sites are displayed in the thread list.

An export function can be included in the system and method of the invention. The export function allows the user to "write-out" history list data in a text format for external use by other users. In the current embodiment, the Copy button 60 is used to copy selected sites from the history list to the system clipboard.

An import function is also provided that enables the user to "read-in" data from another user into the browsing history window. Paste button 65 is used to paste site URLs into the history list from the conventional system clipboard of a computer.

The invention also provides a flexible auditing tool, wherein browsing activity of a user during a specific period of time that the user is engaged in a browsing thread can be monitored, reviewed and/or confirmed. Accordingly, research can be validated, employee performance can be monitored and activity logs can be provided to third-parties, which indicate the direction, order, and quantity of searching that was conducted. It should also be appreciated that third parties (clients) that have augmented their systems with the invention can update, modify and continue research at their own discretion by importing thread files received from third party entities or businesses.

In another aspect of the invention, the invention may be used in with other types of document-oriented systems. For example, an e-mail system is organized into browsing threads. Here, the user records all sent and received messages into specific threads that map to projects for which the user undertook the communication, where each thread corresponds to a specific task, project or theme. Each thread can contain a list of links to the actual e-mail messages.

The browsing thread can be further utilized to include multiple document types, such as combined e-mail communication and web browsing histories based on browsing threads. Here, the user is permitted to log all incoming and outgoing e-mail, as well as web activity, into project-specific or theme-based browsing threads, and may include notes and metadata to make the logged information more readily searchable.

Browsing threads may also be utilized as a basis for collaborative web browsing. For example, multiple users who need to share web-browsing results can exchange a browsing thread back-and-forth to develop a combined browsing history in their specific area of cooperation. The combination may be performed in a multi-user collaborative environment, where threads are posted on a corporate network or intranet, or on the web, for access, review or use by other entities.

The invention also permits users to compile a personal browsing history, which can serve as a basis for personalized software agents that retrieve information from the web on behalf of the user. In particular, personalized agents continue and complete browsing threads started by the user.

While there are shown, described and pointed out fundamental novel features of the invention as applied to a preferred or other embodiments thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for restoring and resuming a saved historical record of browsing activity, comprising:
    opening a thread archive database containing a plurality of browsing threads, each thread comprising a historical list of web page addresses corresponding to web pages viewed via a web browser and selected for recording in the thread, and metadata associated with the thread or thread entries;
    displaying such threads in a user interface that enables user to sort the threads by one or more of date, id number, thread metadata or recorded web page metadata;
    searching said plurality of browsing threads to locate a browsing thread of interest by displaying a keyword index of thread metadata and the threads associated with each indexed keyword, and matching an input keyword or phrase with a keyword or phrase in the index;
    selecting a browsing thread of interest from the display; and
    restoring the selected thread by loading it into the browser enabling review and
    resumption of previous browsing activity.

2. The method of claim 1, wherein the step of searching further includes selecting a date in the graphical user display and displaying of browsing threads having a date stamp that corresponds to the selected date.

3. The method of claim 2, wherein the date stamp of a specific browsing thread is assigned using a most recent visit time of at least one of a web page that is included in the browsing thread, the date that the browsing thread was first created and a set date.

4. The method of claim 1, further comprising the steps of:
    generating a list of thread web pages for display in a viewer window, the list including at least a name associated with each web page in the recorded list;
    displaying the generated list of thread web pages in the viewer window in the order in which the web pages were previously viewed and with a plurality of controls for sorting and filtering the list; and
    updating the generated and displayed lists to include web pages subsequently viewed while in the browsing thread.

5. The method of claim 1, further comprising the steps of:
    modifying the historical list of web page addresses in the restored browsing thread to include additional web page addresses corresponding to web pages viewed after restoration, and metadata associated with the additional web page addresses;
    saving the modified browsing thread and metadata in the thread archive database; and
    updating the keyword index to include the additional metadata.

6. The method of claim 5, further comprising:
    exporting the browsing thread, and all associated metadata, for external use.

7. The method of claim 5, wherein the restored browsing thread is modified through a collaborative effort by multiple persons having access to said thread.

8. The method of claim 1 wherein the thread entry metadata comprises one or more of user-assigned keywords, notes added via an information dialog, or a user assigned rating.

9. The method of claim 1 wherein the thread further comprises emails selectively logged into the thread by the user.

10. The method of claim 1 wherein upon selection of a thread in the display, the displays shows urls in the selected thread including and the time such urls were recorded in the thread.

11. The method of claim 1, wherein the id number comprises a combination of the date and an integer that denotes an ordinal session number for the date.

12. The method of claim 1 wherein selection of one or more terms in the keyword index displays a list of loadable threads containing metadata corresponding to the selected terms.

* * * * *